United States Patent
Calliari

(10) Patent No.: US 8,215,892 B2
(45) Date of Patent: Jul. 10, 2012

(54) ARRANGEMENT FOR MOVING A CARGO-CARRYING APPARATUS ON A VEHICLE

(75) Inventor: David S. Calliari, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1019 days.

(21) Appl. No.: 11/731,476

(22) Filed: Mar. 30, 2007

(65) Prior Publication Data

US 2008/0237285 A1 Oct. 2, 2008

(51) Int. Cl.
*B60P 1/04* (2006.01)
(52) U.S. Cl. .......................... 414/477; 414/469
(58) Field of Classification Search .................. 414/467, 414/468, 469, 474, 475, 476, 477, 478, 479, 414/486, 493, 686, 690, 692
See application file for complete search history.

(56) References Cited

U.S. PATENT DOCUMENTS

| | | | |
|---|---|---|---|
| 3,964,625 A * | 6/1976 | Wirz | 414/471 |
| 4,802,811 A * | 2/1989 | Nijenhuis | 414/478 |
| 4,854,807 A | 8/1989 | Bishop | |
| 4,968,080 A | 11/1990 | Kerry | |
| 5,102,284 A | 4/1992 | Raisio | |
| 5,163,800 A * | 11/1992 | Raisio | 414/500 |
| 5,575,606 A | 11/1996 | Kiefer et al. | |
| 5,601,393 A * | 2/1997 | Waldschmitt | 414/498 |
| 5,672,042 A | 9/1997 | Bartel | |
| 5,722,810 A | 3/1998 | Young et al. | |
| 5,897,123 A | 4/1999 | Cherney et al. | |
| 5,951,235 A | 9/1999 | Young et al. | |
| 6,158,947 A * | 12/2000 | Goiran et al. | 414/500 |
| 6,315,515 B1 | 11/2001 | Young et al. | |
| 6,336,783 B1 | 1/2002 | Young et al. | |
| 6,406,247 B1 * | 6/2002 | Ghiretti et al. | 414/498 |
| 6,447,239 B2 | 9/2002 | Young et al. | |
| 6,558,104 B1 | 5/2003 | Vlaanderen et al. | |
| 6,669,433 B1 | 12/2003 | De Kock | |
| 6,705,823 B2 | 3/2004 | Bohata | |
| 6,712,578 B2 | 3/2004 | Chabanas et al. | |
| 6,918,721 B2 | 7/2005 | Venton-Walters et al. | |

(Continued)

FOREIGN PATENT DOCUMENTS

DE 296 04 947 U1 7/1997

(Continued)

OTHER PUBLICATIONS

PCT International Search Report, based on International Application No. PCT/US2006/062142, date of mailing of the International Search Report Jul. 23, 2007 (2 pgs.).

*Primary Examiner* — Saul Rodriguez
*Assistant Examiner* — Glenn Myers
(74) *Attorney, Agent, or Firm* — Foley & Lardner LLP

(57) ABSTRACT

A method and an arrangement for moving a cargo-carrying apparatus on a vehicle from a first position to a second position. The vehicle has a longitudinal center line and includes a hook arm having a pivot end and a hook end, with the hook end coupled to the cargo carrying apparatus. The arrangement comprises a plurality of rollers mounted on one of the vehicle and the cargo-carrying apparatus. A pivot joint is positioned in the hook arm between the pivot end and the hook end. The hook end maintains engagement with the cargo-carrying apparatus on the vehicle in both the first position and the second position.

18 Claims, 3 Drawing Sheets

U.S. PATENT DOCUMENTS

| | | | |
|---|---|---|---|
| 6,962,473 B2 * | 11/2005 | Scranton et al. | 414/475 |
| 6,997,506 B2 | 2/2006 | Hecker | |
| 7,118,314 B2 | 10/2006 | Zhou et al. | |
| 7,207,582 B2 | 4/2007 | Siebers et al. | |
| 7,226,080 B2 | 6/2007 | Humphries | |
| 7,264,305 B2 | 9/2007 | Kuriakose | |
| 7,331,586 B2 | 2/2008 | Trinkner et al. | |
| 7,489,098 B2 | 2/2009 | Harris et al. | |
| 7,517,005 B2 | 4/2009 | Kuriakose | |
| 7,556,468 B2 | 7/2009 | Grata | |
| 7,671,547 B2 | 3/2010 | Addleman | |
| 2002/0146306 A1 * | 10/2002 | Morrell | 414/340 |
| 2005/0220589 A1 * | 10/2005 | Covington et al. | 414/491 |
| 2007/0154295 A1 | 7/2007 | Kuriakose | |
| 2007/0235403 A1 | 10/2007 | Ethington et al. | |
| 2008/0279667 A1 | 11/2008 | Addleman et al. | |
| 2009/0139947 A1 | 6/2009 | Harris et al. | |
| 2009/0263222 A1 | 10/2009 | Kuriakose et al. | |
| 2009/0285662 A1 | 11/2009 | Addleman et al. | |

FOREIGN PATENT DOCUMENTS

| | | |
|---|---|---|
| EP | 0 594 405 B1 | 4/1994 |
| EP | 0 618 105 B1 | 10/1994 |
| GB | 2 274 645 A | 8/1994 |
| GB | 2 332 425 A | 6/1999 |
| WO | WO2004/083081 | 9/2004 |

* cited by examiner

ARRANGEMENT FOR MOVING A CARGO-CARRYING APPARATUS ON A VEHICLE

FIELD

The present invention relates to equipment for loading and unloading cargo and more particularly for an arrangement for a load handling system for moving a cargo carrying apparatus on a vehicle.

BACKGROUND OF THE INVENTION

Equipment used for loading and unloading material and cargo-carrying apparatus, such as cargo containers and flat racks, is typically referred to as a load handling system (LHS). An LHS typically includes a hooked arm that engages a container or engages an A-frame of a flat rack and pulls it onto a vehicle. Offloading occurs in the reverse of such procedure to offload a container or flat rack from a vehicle. For loading and unloading a flat rack, the LHS system must engage the bale bar/lift bar on an A-frame of the flat rack.

In order to move a cargo-carrying apparatus within the confines of a defined volume, such as the interior of an airplane, it is usually necessary to disengage the hook arm of the LHS from the cargo-carrying apparatus. Typically, additional material handling equipment is also required to load and unload the cargo-carrying apparatus and to secure the cargo-carrying apparatus. FIG. 1 illustrates one example of a local handling system requiring disengagement from a hook arm from a cargo carrying apparatus.

Thus there is a need for an arrangement for a load handling system for moving a cargo-carrying apparatus on and off the vehicle without disengaging the hook arm of the LHS from the cargo-carrying apparatus. There is also a need for a method for moving a cargo-carrying apparatus on and off a vehicle without disengaging the hook arm of the LHS from the cargo-carrying apparatus.

SUMMARY OF THE INVENTION

There is provided an arrangement for moving a cargo-carrying apparatus having a pivoting member on a vehicle from a first position to a second position. The vehicle has a longitudinal center line and includes a hook arm having a pivot end and a hook end, with the hook end coupled to the cargo carrying apparatus. The arrangement comprises a plurality of horizontal rollers mounted on one of the vehicle and the cargo-carrying apparatus. A pivot joint is positioned in the hook arm between the pivot end and the hook end with the pivot joint proximate the pivoting member pivot point. The hook end maintains engagement with the cargo-carrying apparatus on the vehicle in both the first position and the second position. Another embodiment of the arrangement for moving a cargo-carrying apparatus provides that in the first position the hook arm and a portion of the cargo-carrying apparatus are in a parallel, side-by-side position when the cargo-carrying apparatus is positioned for travel on the vehicle.

There is also provided a method for positioning a flat rack coupled to a vehicle in a defined volume. The flat rack has a pivotal A-frame and the vehicle has a longitudinal center line and a hook arm having a pivot end and a hook end. The method includes providing a plurality of horizontal rollers. Coupling the rollers to one of the vehicle and the flat rack. Coupling the hook end to the A-frame. Moving the hook end and the A-frame from a first position to a second position wherein the flat rack moves on the rollers. Moving the vehicle and flat rack in the defined volume where the hook end and the A-frame are coupled together and in the second position.

There is also provided an arrangement for moving a platform having a pivoting member on a vehicle from a first position to a second position. The vehicle has a longitudinal center line and includes a hook arm having a pivot end and a hook end, with the hook end coupled to the platform. The arrangement for moving a platform on a vehicle includes a plurality of horizontal rollers mounted on the vehicle and a pivot joint positioned in the hook arm between the pivot end and the hook end, with the pivot joint proximate the pivoting member pivot joint. The hook end maintains engagement with the platform on the vehicle in both the first position and the second position.

There is further provided a system for moving a cargo-carrying apparatus between a vehicle and a storage volume, including a hook arm having a first portion coupled to the vehicle at a first pivot point, and a second portion coupled to a hook. A cargo-carrying platform is slidably engaging the vehicle for movement between the vehicle and the storage volume. A bail bar having a first portion and a second portion, the first portion engagable with the hook and the second portion is pivotally coupled to the cargo-carrying platform at a second pivot point. The bail bar being pivotally movable about the second pivot point between a first position for use outside the storage volume and a second position for use inside the storage volume. The first pivot point and the second pivot point are proximate one another so that the hook remains engaged to the first portion of the bail bar as the bail bar and the hook arm are moved between the first position and the second position.

DETAILED DESCRIPTION OF EXEMPLARY EMBODIMENTS

Before beginning a detailed description of exemplary embodiments of an Arrangement for Moving a Cargo-Carrying Apparatus on a vehicle, several general comments are warranted about the applicability and scope of the present invention.

The vehicle 10 illustrated in the figures is a truck, however, it should be understood that the vehicle 10 on which an arrangement for moving a cargo-carrying apparatus 30 is coupled to a load handling system (LHS) is mounted, can be a trailer or other suitable vehicle. The figure also illustrates a weight bearing element as being a wheel. It should be understood that multiple wheel combinations are within the scope of the present disclosure. For instance, a six or four wheel vehicle can be used to mount the LHS system including the arrangement 30. It is also contemplated that the weight bearing elements can be a continuous track mounted on wheels. It is also contemplated that the vehicle 10 can be on a track system for instance a railroad or a monorail track.

The support structure of the vehicle 10 can include multiple weight bearing elements as described above. A vehicle 10 typically has a power source coupled to a transmission with the transmission operatively coupled to at least two of the wheels. Some or all of the wheels can be steerable. The power source can be an internal combustion engine such as a gasoline engine or a diesel engine and it may also be an electric motor coupled to a prime mover such as an internal combustion engine or an energy storage device or the like. It is also contemplated that the power source can be a hybrid system which includes two or more of the previously mentioned systems.

Figure 1:
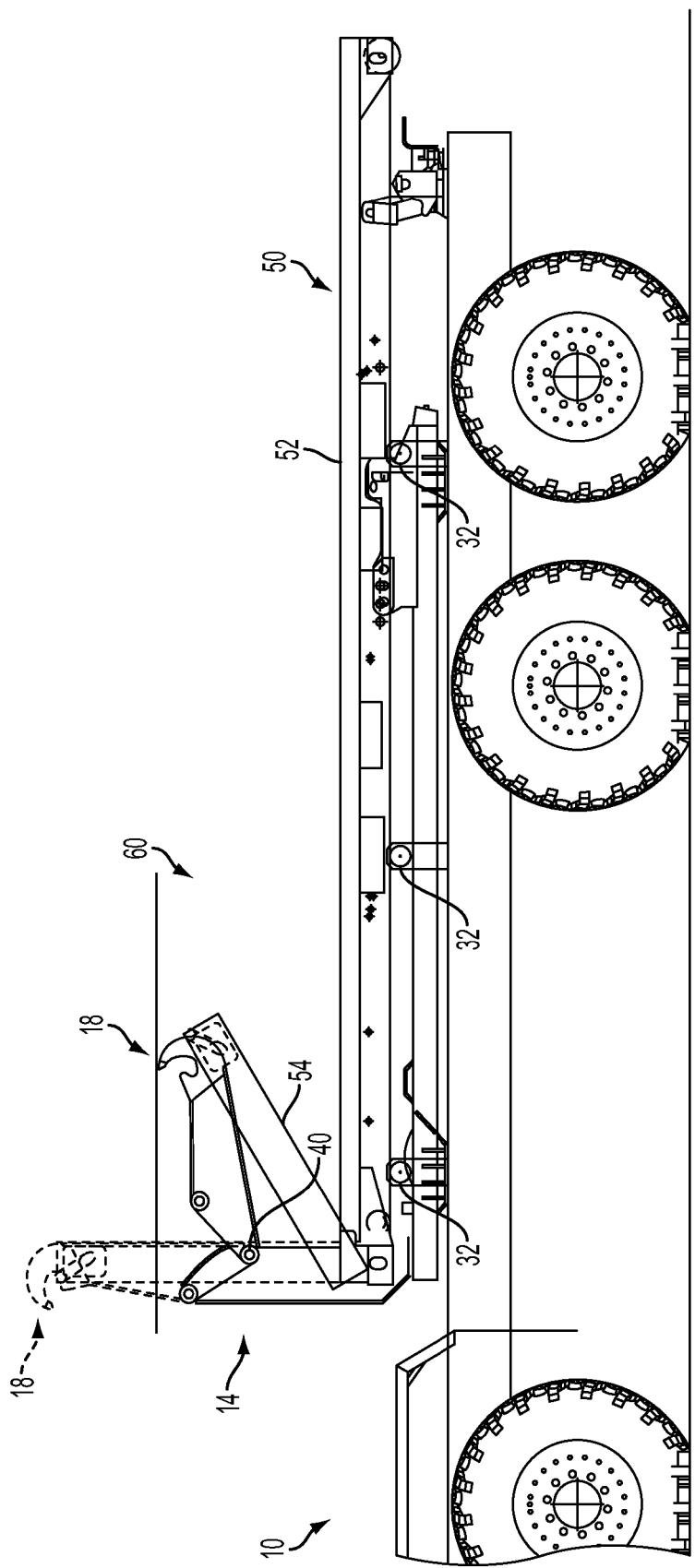
FIG. 1 is a plan side view of an exemplary embodiment of a prior art LHS and a flat rack on a vehicle.

Referring now to the Figures, FIG. 1 illustrates of a prior art hook arm 14 used on a typical LHS. This hook arm includes a hook 18 that is designed to engage, directly, the flat rack/bail bar on the A-frame 54 of the flat rack 52. Such a hook can also be used with a front end adapter coupled to a container (not shown). The A-frame 54 moves about a pivot point 56. The hook member 18 can be integrally formed with the hook arm 14 or it can be removably coupled to the hook arm 14 by suitable fasteners.

FIG. 1 illustrates the hook arm 14 in a first position (e.g., travel position shown in broken line) in which the hook end 18 of the hook arm 14 is engaged with the A-frame 54 of the flat rack 52. FIG. 1 also illustrates the hook arm 14 and the A-frame 54 in a second position (solid line) placed in a defined volume 60. It should be noted that in this position, the hook end 18 is disengaged from the A-frame 54. In such condition, the flat rack 52 or other cargo-carrying apparatus 50 would have to be secured with means other than the hook arm 14.

Figure 2:
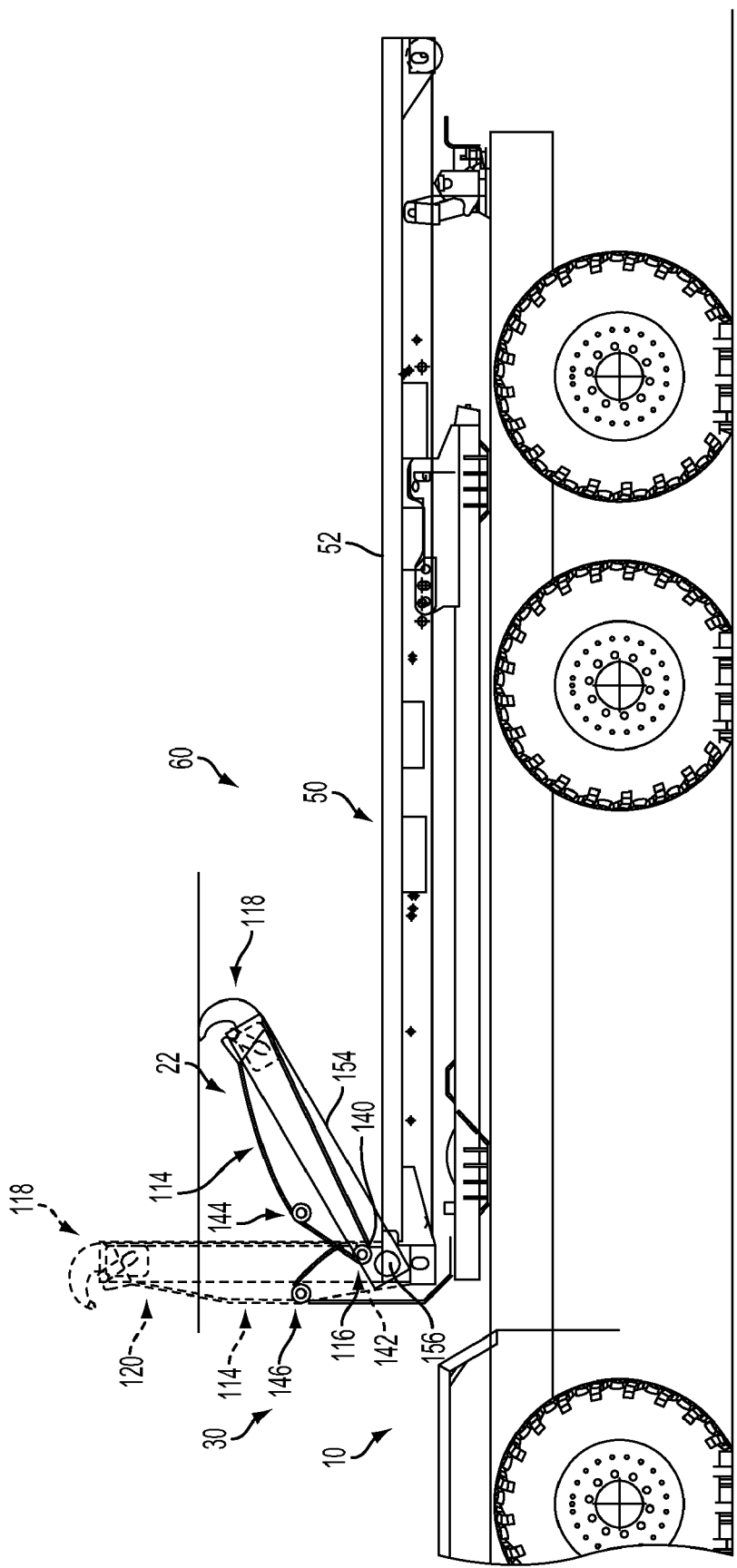
FIG. 2 is a side plan view of an exemplary embodiment of an arrangement for moving a cargo-carrying apparatus, a flat rack, on a vehicle with the hook arm of the LHS engaged with the A-frame of the flat rack in a first position and a second position, with the second position being within a defined volume.
Figure 3:
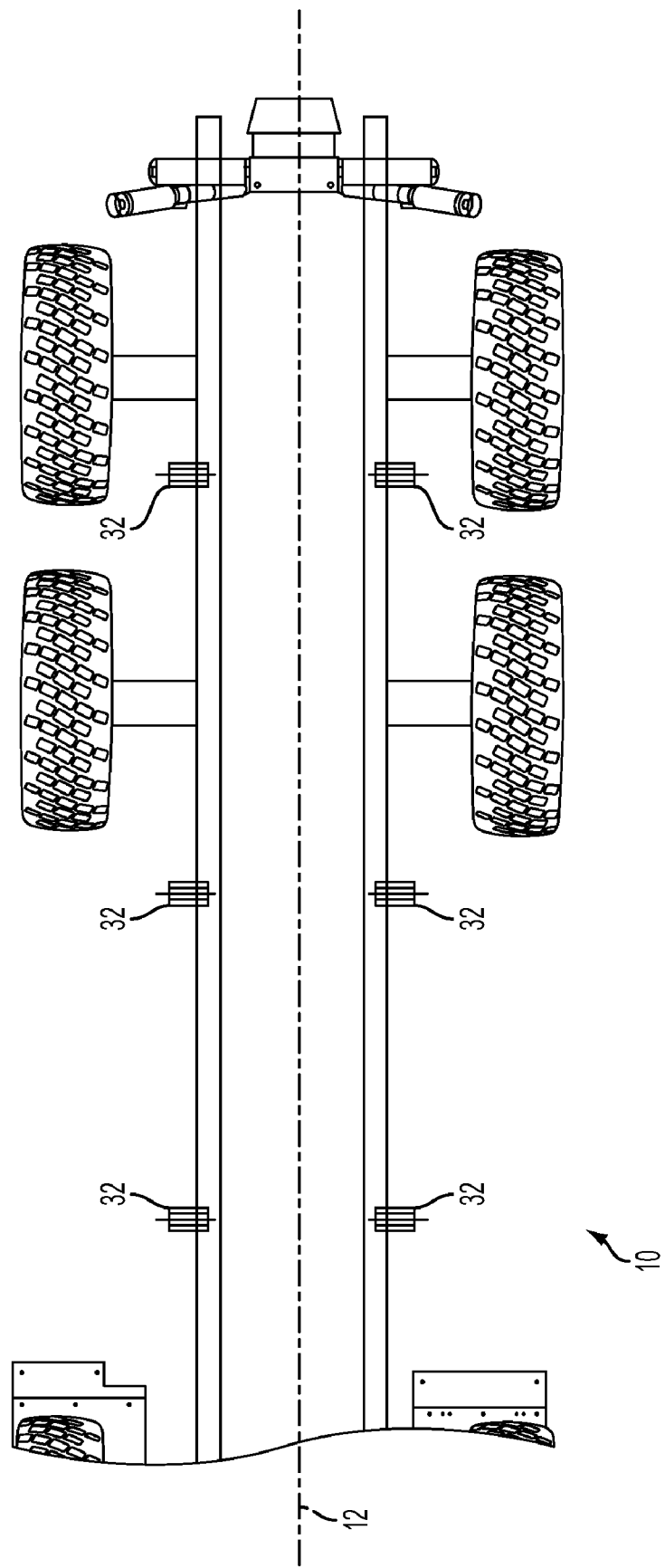
FIG. 3 is a top plan view of an exemplary embodiment of an arrangement of a plurality of rollers mounted on a vehicle.

Referring now to FIGS. 2 and 3, there is illustrated an exemplary embodiment of an arrangement 30 for moving a cargo-carrying apparatus 50 on a vehicle 10 from a first position 120 to a second position 122. The vehicle 10 includes a longitudinal center line 12 (FIG. 3) and includes a hook arm 114 having a pivot end 116 and a hook end 118. The hook end 118 is coupled to the cargo-carrying apparatus 50. The arrangement 30 includes a plurality of horizontal rollers 32 mounted on one of the vehicle 10 and cargo-carrying apparatus 50. FIG. 3 illustrates the rollers 32 mounted to the support structure of the vehicle 10 and aligned horizontal relative to the vehicle 10. The rollers 32 facilitate movement of the cargo-carrying apparatus 50 during the loading and unloading procedure and during positioning of the vehicle 10 with a flat rack 52 inside a defined volume 60 such as an aircraft interior. The arrangement also includes a pivot joint 140 which defines a first axis positioned in the hook end 118 between the pivot end 116 and the hook end 118. The pivot joint 140 is proximate the pivot point 156, which defines a second axis, of the A-frame 154. The first and second axis are substantially parallel to each other and are a spaced distance apart. Because of the positioning of the pivot joint 140, the hook end 118 maintains engagement with the A-frame 154 of the cargo-carrying apparatus 50 on the vehicle 10 in both the first position 120 and the second position 122. (See FIG. 2.)

In a typical operation, the first position 120 has the hook arm 114 and a portion, such as the A-frame 154, of the cargo carrying apparatus 50 in a parallel, side-by-side position when the cargo-carrying apparatus 50 is positioned for travel on the vehicle 10. In FIG. 2, the broken line illustrates such parallel, side-by-side position of the hook arm 114 and the A-frame 154 of the cargo-carrying apparatus 50. The A-frame 54 is typically an element of a flat rack 52. If the cargo-carrying apparatus 50 is a container, a front lift adapter (not shown) typically is coupled to the container for engagement with the hook arm 14.

In moving to a second position 122 (solid lines in FIG. 2), the hook arm 114 is unlocked by a lock pin 144 which is positioned proximate the pivot joint 140 to secure the hook end 118 in the first position 120. An actuator 142 coupled to the hook arm 114 moves the hook arm 114 about the pivot joint 140 between the first position 120 and the second position 122. The actuator 142 can be one of a manual/mechanical system, pneumatic unit, hydraulic and an electric unit having sufficient force and power for its intended use. Control of the actuator can occur from the cab of the vehicle 10 or remotely either by a tethered control unit, an acoustic device, or electromagnetic signal such as a light wave or a radio frequency signal, or by simple pin joint and manual control.

The second position 122 of the hook arm 114 and the portion 154 of the cargo-carrying apparatus 50 is a position not perpendicular to the horizontal plane of the cargo-carrying apparatus or the longitudinal center line 12 of the vehicle 10. The lock pin 144 can be controlled by a second actuator 146 which is coupled to the lock pin 144 in any convenient manner, for example with a swivel bolt, and configured to move the lock pin 144 from one of a locked position and an unlocked position or by simple pin or mechanical hardware removed from "pinned joint".

In operation, when the hook arm 114 and A-frame 154 of the flat rack 52 moves from the first position 120 to the second position 122, the hook end 118 of the hook arm 114 and the A-frame 154 are coupled together and stay coupled together throughout the process. As the hook arm 114 moves back toward the rear of the vehicle, the flat rack 52 moves on the rollers 32 or sliding surface(s) towards the back of the vehicle 10. One advantage of the arrangement for moving a cargo-carrying apparatus 50, is to maintain the hook arm 114 in contact with the A-frame 154 of the flat rack 52 while the flat rack 52 remains on the vehicle 10 for movement within a defined volume 60 such as the interior of an airplane. With this configuration, the vehicle 10 and the flat rack 52 can be loaded and unloaded from the interior of an airplane, such as a C130 aircraft, without requiring additional load handling equipment.

The hook arm 114 is composed of a material selected from a group including a metal such as steel, or a composite material or a combination of metal and composite material. The material composition of the hook arm 114 should have suitable strength and resilient characteristics for the type of application that is intended. The number of rollers 32 utilized on either the vehicle 10 or on the cargo carrying apparatus 50 should be commensurate with the type of load supported by the cargo-carrying apparatus 50 and the weight of such load to properly distribute the weight on the vehicle 10.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

Thus, there is provided an arrangement for moving a cargo-carrying apparatus on a vehicle from a first position to a second position with a hook arm 114 maintaining engagement with the cargo-carrying apparatus 50 built the first position and second position. Although several embodiments of the present invention have been disclosed and described in detail herein, various modifications may be made. For example, an offset hook member can be coupled to the hook arm 114. The hook arm 114 can be telescopic and manipulated with an actuator. Other substitutions, modifications, changes and omissions may be made in the design, operating conditions and arrangement of the exemplary embodiments without departing from the spirit or scope of the appended claims.

What is claimed is:

1. An arrangement for moving a cargo-carrying apparatus having a pivoting member between a vehicle and a storage volume having a fixed height, the pivoting member coupled to the cargo-carrying apparatus by a pivot point, and the vehicle having a longitudinal centerline and including a hook arm having a pivot end and a hook end, with the hook end coupled to the cargo-carrying apparatus, the arrangement comprising:
   a plurality of horizontal rollers mounted on one of the vehicle and cargo-carrying apparatus; and
   a pivot joint positioned in the hook arm between the pivot end and the hook end with the pivot joint proximate the pivot point of the pivoting member,
   wherein the hook end maintains engagement with the cargo-carrying apparatus on the vehicle throughout its motion between a first position for use outside the storage volume with the hook end above the fixed height, and a second position for use inside the storage volume with the hook end below the fixed height, wherein in the first position the hook arm and a portion of the cargo-carrying apparatus are disposed in a parallel, side-by-side position when the cargo-carrying apparatus is positioned for travel on the vehicle, and wherein the height of the arrangement in the second position is less than the height of the arrangement in the first position.

2. The arrangement of claim 1, wherein the hook end is moved about the pivot joint by an actuator.

3. The arrangement of claim 2, wherein the actuator is one of a mechanical unit, pneumatic unit, hydraulic unit and an electric unit.

4. The arrangement of claim 1, wherein the second position is not perpendicular to the longitudinal centerline of the vehicle.

5. The arrangement of claim 1, including a lock pin proximate the pivot joint to secure the hook end in the first position.

6. The arrangement of claim 5, including a second actuator coupled to the lock pin and configured to move the lock pin from one of a locked position and unlocked position.

7. The arrangement of claim 1, wherein the cargo-carrying apparatus is a flat rack.

8. An arrangement for moving a platform having a pivoting member between a vehicle and a storage volume having a fixed height, the pivoting member coupled to the platform at a pivot point, and the vehicle having a longitudinal centerline and including a hook arm having a pivot end and a hook end, with the hook end coupled to the platform, the arrangement comprising:
   a plurality of horizontal rollers mounted on the vehicle; and
   a pivot joint positioned in the hook arm between the pivot end and the hook end with the pivot joint positioned proximate the pivot point of the pivoting member,
   wherein the hook end maintains engagement with the pivoting member of the platform on the vehicle throughout its motion between a first position for use outside the storage volume with the hook end at least partially above the fixed height, and a second position for use inside the storage volume with the hook end pivoted to an elevation beneath the fixed height, wherein in the first position the hook arm and a portion of the platform are disposed in a parallel, side-by-side position when the platform is positioned for travel on the vehicle, and wherein the height of the arrangement in the second position is less than the height of the arrangement in the first position.

9. The arrangement of claim 8, wherein the hook end is moved about the pivot joint by an actuator.

10. The arrangement of claim 9, wherein the actuator is one of a pneumatic unit, hydraulic unit and an electric unit.

11. The arrangement of claim 8, wherein the second position is not perpendicular to the longitudinal centerline of the vehicle.

12. The arrangement of claim 8, including a lock pin proximate to the pivot joint to secure the hook end in the first position.

13. The arrangement of claim 12, including a second actuator coupled to the lock pin and configured to move the lock pin from one of a locked position and unlocked position.

14. The arrangement of claim 8, wherein the platform is one of a flatrack and a container.

15. A system for moving a cargo-carrying apparatus between a vehicle and a storage volume having a fixed height, comprising:
   a hook arm having a first portion coupled to the vehicle at a first pivot point, and a second portion coupled to a hook;
   a cargo-carrying platform slidably engaging the vehicle for movement between the vehicle and the storage volume;
   a bail bar having a first portion and a second portion, the first portion engagable with the hook and the second portion pivotally coupled to the cargo-carrying platform at a second pivot point, the bail bar being pivotally movable about the second pivot point between a first position for use outside the storage volume where the hook is disposed at a first elevation above the fixed height of the storage volume, and a second position for use inside the storage volume where the hook is disposed at a second elevation beneath the fixed height of the storage volume,
   wherein the first pivot point and the second pivot point are proximate one another so that the hook remains engaged to the first portion of the bail bar as the bail bar and the hook arm are moved between the first position and the second position, and wherein in the first position the hook arm and a portion of the cargo-carrying apparatus are disposed in a parallel, side-by-side position when the platform is positioned for travel on the vehicle, and wherein the height of the arrangement in the second position is less than the height of the arrangement in the first position.

16. The system of claim 15, wherein the first position is substantially perpendicular to a plane of the cargo-carrying platform and prevents movement of the cargo-carrying platform into the storage volume.

17. The system of claim 16, wherein the second position is non-perpendicular to a plane of the cargo-carrying platform and permits movement of the cargo-carrying platform within the storage volume.

18. The system of claim 15, wherein the first pivot point defines a first axis and the second pivot point defines a second axis, the first axis and the second axis being substantially parallel and separated by a first length.

\* \* \* \* \*